US010370957B2

United States Patent
Jin et al.

(10) Patent No.: US 10,370,957 B2
(45) Date of Patent: Aug. 6, 2019

(54) MEASURING DOWNHOLE TEMPERATURE BY COMBINING DAS/DTS DATA

(71) Applicant: CONOCOPHILLIPS COMPANY, Houston, TX (US)

(72) Inventors: Ge Jin, Houston, TX (US); Herbert W. Swan, Houston, TX (US); Baishali Roy, Houston, TX (US); Kyle R. Krueger, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 199 days.

(21) Appl. No.: 15/453,216

(22) Filed: Mar. 8, 2017

(65) Prior Publication Data
US 2017/0260846 A1    Sep. 14, 2017

Related U.S. Application Data

(60) Provisional application No. 62/305,758, filed on Mar. 9, 2016, provisional application No. 62/305,777, filed on Mar. 9, 2016.

(51) Int. Cl.
*G01N 21/47* (2006.01)
*G01N 25/00* (2006.01)
(Continued)

(52) U.S. Cl.
CPC .......... *E21B 47/065* (2013.01); *G01B 11/161* (2013.01); *G01K 11/32* (2013.01)

(58) Field of Classification Search
CPC ....... G01K 11/32; G01B 11/161; E21B 47/05; G01N 21/47; G01N 25/00; G01M 3/165
See application file for complete search history.

(56) References Cited

U.S. PATENT DOCUMENTS

| 6,778,720 B1 | 8/2004 | Cekorich et al. |
| 7,668,411 B2 | 2/2010 | Davies et al. |

(Continued)

FOREIGN PATENT DOCUMENTS

| WO | 2015076976 A1 | 5/2015 |
| WO | 20150107332 A1 | 7/2015 |
| WO | 20150170113 A1 | 11/2015 |

OTHER PUBLICATIONS

Boman, K.,—"DAS Technology Expands Fiber Optic Applications for Oil, Gas Industry", 2015, Rigzone, Energy News Article, May 4, 2015 issue, http://www.rigzone.com/news/oil_gas/a/138405/DAS_Technology_Expands_Fiber_Optic_Applications_for_Oil_Gas_Industry; 4 pgs.

(Continued)

*Primary Examiner* — Gail Kaplan Verbitsky
(74) *Attorney, Agent, or Firm* — ConocoPhillips Company (57) ABSTRACT

This disclosure describes a method of combining DAS and DTS data to accurately estimate borehole temperature. The described method takes advantage of the thermal sensitivity of DAS signal in the low-frequency band, and combines with the absolute temperature measurement from DTS, to produce a distributed temperature estimation that is up to 10000 more accurate than the current commercial solution. The DAS and DTS data should be record simultaneously at the same well. The DAS data are first low-pass filtered and then converted into temperature variation measurement. Then an accurate temperature estimation is obtained by fitting both DTS and DAS data.

8 Claims, 6 Drawing Sheets

(51) Int. Cl.
    *E21B 47/06* (2012.01)
    *G01K 11/32* (2006.01)
    *G01B 11/16* (2006.01)

(56) References Cited

U.S. PATENT DOCUMENTS

| | | | |
|---|---|---|---|
| 8,630,816 B2 | 1/2014 | Park et al. | |
| 8,646,968 B2 | 2/2014 | MacDougall et al. | |
| 8,930,143 B2 | 1/2015 | Sierra et al. | |
| 9,116,119 B2 * | 8/2015 | Le Floch | G01D 5/35364 |
| 9,273,548 B2 * | 3/2016 | LeBlanc | E21B 47/06 |
| 10,095,828 B2 * | 10/2018 | Swan | E21B 47/02 |
| 2006/0272809 A1 | 12/2006 | Tubel et al. | |
| 2009/0114386 A1 | 5/2009 | Hartog et al. | |
| 2013/0265569 A1 * | 10/2013 | Le Floch | G01D 5/35364 356/73.1 |
| 2013/0298635 A1 | 11/2013 | Godfrey | |
| 2014/0358444 A1 | 12/2014 | Friehauf et al. | |
| 2015/0146759 A1 | 5/2015 | Johnston | |
| 2016/0003032 A1 | 1/2016 | Grubb et al. | |
| 2017/0045410 A1 * | 2/2017 | Crickmore | G01M 3/002 |
| 2018/0230049 A1 * | 8/2018 | Wysocki | C03B 37/032 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.
Optasense, "Pipeline Integrity Management: Leak Detection", 2013 brochure, www.optasense.com; 5 pgs.
International Search Report dated Jun. 1, 2017 for International Application No. PCT/US2017/021667; 1 pg.

* cited by examiner

MEASURING DOWNHOLE TEMPERATURE BY COMBINING DAS/DTS DATA

PRIOR RELATED APPLICATIONS

This application is a non-provisional application which claims benefit under 35 USC § 119(e) to U.S. Provisional Application Ser. No. 62/305,758 filed Mar. 9, 2016, entitled LOW FREQUENCY DISTRIBUTED ACOUSTIC SENSING, and Ser. No. 62/305,777 filed Mar. 9, 2016, entitled PRODUCTION LOGS FROM DISTRIBUTED ACOUSTIC SENSORS, each of which is incorporated herein in its entirety.

FEDERALLY SPONSORED RESEARCH STATEMENT

Not applicable.

FIELD OF THE DISCLOSURE

The present invention relates generally to the use of distributed fiber optic sensing including Distributed Acoustic Sensing (DAS) and Distributed Temperature Sensing (DTS) in subterranean wellbores for temperature measurement. In particular, this application is directed to precise measurement of temperature in downhole environments utilizing fiber optic signals, including DAS and DTS signals, to obtain real-time temperature information.

BACKGROUND OF THE DISCLOSURE

Precise distributed borehole temperature measurements are important for completion and production monitoring. For example, different borehole temperatures for unconventional wells reflect different fracture geometry and completion results for hydraulic fracturing operations. Borehole temperature anomalies are the indicator of leakage or well integrity problems. Temperature variations during production can be used to estimate production allocation of different well sections. Therefore, accurate borehole temperature information can provide better production estimation and better planning and execution to safely optimize production.

Many methods have been proposed to measure borehole temperatures. Placing a number of temperature sensors at different depths of a borehole is a simple way to accomplish the task, but this method cannot provide continuous data along the borehole, especially when the wells are drilled several miles in different directions.

Distributed Temperature Sensing (DTS) is a way of measuring temperature in a continuous manner. DTS systems are optoelectronic devices that measure temperature by means of optical fibers functioning as linear sensors. Temperatures are recorded along the optical sensor cable, thus not at discrete widely separated points, but as a continuous profile. Temperature determination is achieved over great distances. Typically the DTS systems can locate the temperature to a spatial resolution of 1 m with accuracy to within ±1° C. at a resolution of 0.01° C. Measurement distances of greater than 30 km can be monitored and some specialized systems can provide even tighter spatial resolutions.

Physical measurement dimensions, such as temperature or pressure and tensile forces, can affect glass fibers and locally change the characteristics of light transmission in the fiber. By damping the light into the quartz glass fibers and measuring the arrival time of the backscattered light, the location of an external physical effect can be determined so that the optical fiber can be employed as a linear sensor. Optical fibers are made from doped quartz glass. Quartz glass is a form of silicon dioxide ($SiO_2$) with amorphous solid structure. The light scattered back from the fiber optic therefore contains three different spectral shares:
  the Rayleigh scattering with the wavelength of the laser source used,
  the Stokes line components from photons shifted to longer wavelength (lower frequency), and
  the anti-Stokes line components with photons shifted to shorter wavelength (higher frequency) than the Rayleigh scattering.

One kind of the light scattering, also known as Raman scattering, occurs in the optical fiber. Unlike incident light, this scattered light undergoes a spectral shift by an amount equivalent to the resonance frequency of the lattice oscillation. Thermal effects induce lattice oscillations within the solid. When light falls onto these thermally excited molecular oscillations, an interaction occurs between the light particles (photons) and the oscillation of the molecule. The intensity of the so-called anti-Stokes band is temperature-dependent, while the so-called Stokes band is practically independent of temperature. The local temperature of the optical fiber is derived from the ratio of the anti-Stokes and Stokes light intensities.

There are two basic principles of measurement for distributed sensing technology, Optical Time Domain Reflectometry (OTDR) and Optical Frequency Domain Reflectometry (OFDR). For Distributed Temperature Sensing often a Code Correlation (CC) technology is employed, which carries elements from both principles.

OTDR was developed more than 20 years ago and has become the industry standard for telecom loss measurements and detects Rayleigh backscattering signals, which dominate the weaker Raman signals. The principle for OTDR is quite simple and is very similar to the time of flight measurement used for radar. Essentially a narrow laser pulse generated either by semiconductor or other solid state laser is sent into the fiber and the backscattered light is analyzed. From the time it takes the backscattered light to return to the detection unit it is possible to locate the location of the temperature event.

Alternative DTS evaluation units deploy the method of Optical Frequency Domain Reflectometry (OFDR). The OFDR system provides information on the local characteristic only when the backscatter signal detected during the entire measurement time is measured as a function of frequency in a complex fashion, and then subjected to Fourier transformation. The essential principles of OFDR technology are the quasi continuous wave mode employed by the laser and the narrow-band detection of the optical backscatter signal. This is offset by the technically difficult measurement of the Raman scatter light and rather complex signal processing, due to the fast Fourier transform (FFT) calculation with higher linearity requirements for the electronic components.

Code Correlation DTS sends on/off sequences of limited length into the fiber. The codes are chosen to have suitable properties, e.g. Binary Golay code. In contrast to OTDR technology, the optical energy is spread over a code rather than packed into a single pulse. Thus a light source with lower peak power compared to OTDR technology can be used, e.g. long life compact semiconductor lasers. The detected backscatter needs to be transformed—similar to OFDR technology—back into a spatial profile, e.g. by cross-correlation. In contrast to OFDR technology, the emission is finite (for example 128 bit) which avoids that weak scattered signals from afar are superposed by strong scattered signals from a short distance, thus improving the shot noise and the signal-to-noise ratio.

For example, U.S. Pat. No. 8,630,816 (Park et al.) provides a high spatial resolution DTS sensor having a resolution of 25 mm or less, but does not address the temperature resolution issue. U.S. Pat. No. 8,646,968 (MacDougall et al.) provides a DTS sensor in hydrogen environment having an accuracy of ±1.7° C. U.S. Pat. No. 8,930,143 (Sierra et al.) provides a method of enhancing DTS resolution by using a thermal tracer (a temperature anomaly) in repeated acquisition and multiple functions, but no actual measurement data was provided.

DAS is an acoustic detection technology that has recently been applied in production and geophysical settings. Downhole DAS is a fiber-optic distributed sensing technology that can provide key diagnostic insights during hydraulic fracturing operations.

DAS is the measure of Rayleigh scatter distributed along the fiber optic cable. A coherent laser pulse is sent along the optic fiber, and scattering sites within the fiber cause the fiber to act as a distributed interferometer with a gauge length approximately equal to the pulse length. The intensity of the reflected light is measured as a function of time after transmission of the laser pulse. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

Raw DAS data are usually in the form of optical phase, with a range from −pi to +pi. The optical phase is defined by the interference pattern of the back-scattered laser energy at two locations separated by a certain length (gauge length) along the fiber. The phase varies linearly with a small length change between these two locations, which can be interpreted as axial strain change of the fiber in between. Depending on the vender, the measured optical phase is sometimes differentiated in time before it is stored. In this case, the DAS data can be considered as linear scaled fiber strain rates.

In practice, fiber-optic cables can be installed in vertical and horizontal wells, which can be treatment wells, injector wells, production wells, or monitor wells. Within the cable, there are often both single mode fibers for DAS and multi-mode fibers for DTS. Multiple fibers within one cable can offer redundancy and the ability to interrogate with different instrumentation simultaneously.

The current solution using DTS can only provide the temperature measurement with an accuracy around 0.1° F. On the other hand, the low-frequency component of Distributed Acoustic Sensing (DAS) as described in U.S. Provisional Application Ser. No. 62/305,758 is very sensitive to the temperature variation, with an accuracy up to $10^{-5}$° F./s, but DAS cannot measure absolute temperature, thus making the temperature change relative in the downhole context.

US20150146759 (by Johnston) describes a system combining of DAS and DTS temperature measuring devices, but failed to illustrate the fitting models or relationship between DAS data and DTS data to obtain a meaningful temperature reading. Although US20150146759 can measure the temperature change for a certain time interval, it provides no method to numerically combine the DAS and DTS data to get continuous and precise absolute temperature measurement.

Therefore, there is a need for an efficient way of measuring borehole temperature that is accurate and responsive so as to calculate the optimal completion design and production optimization.

SUMMARY OF THE DISCLOSURE

The method described herein generally relates to a method of precisely measuring borehole temperature by combining both DAS and DTS data. With the accurate absolute temperature measured by DTS and the responsive, high resolution of DAS measuring, the borehole temperature can be measured with accuracy in terms of both temperature and location along the borehole.

As discussed above, while DTS can only provide the temperature measurement with an accuracy around 0.1° F. with a relatively low sampling rate, it has the benefit of measuring absolute temperature, rather than just the variations thereof. DAS, on the other hand, provides a much higher sampling rate, high precision (±1E-5° F./s), and a distributed temperature measurement (every 5 meters). However, it provides only information about the relative changes in temperature. Combining the two, as described herein provides a novel way to accurately and continuously measure borehole temperature with high precision.

Completion costs, especially through hydraulic fracturing, vary but are always a significant expenditure in all unconventional resources plays. Measurement and analysis of borehole temperature would allow completion engineers to optimize the process, as the fluid distribution, fracture geometry, etc. would be different if they show a different warm-back temperature signature after the injection. With continued analysis, the disclosed method can be used to impact decisions on completion design, production optimization, valve actuation, etc. All these parameters affect appraisal and development economics in each unconventional asset, and are directly related to the borehole temperature in question.

In order to achieve the temperature measurement, the well under monitoring is equipped with fiber optics for detecting and recording both DAS and DTS signals along the wellbore. The recorded DAS signals are first converted and then combined with the DTS signal. A first equation is used to convert DAS signal for temperature variation, and a second equation is used to calculate the misfit to optimize the temperature measurement. The final estimated temperature should therefore reflect both the accurate temperature variation from DAS data and the absolute temperature value from DTS.

In more detail, the invention includes any one or more of the flowing embodiments in any combinations thereof:

A method of measuring temperature variations along a wellbore, the method comprising:
   providing one or two fiber optic cable(s) along a length of a wellbore;
   recording distributed acoustic sensing (DAS) signals along the wellbore well using said fiber optic cable(s);
   simultaneously recording distributed temperature sensing (DTS) signals from the well using said fiber optic cable(s);
   low-pass filter and down-sample the DAS signals to obtain low-frequency DAS data.
   converting the low-frequency DAS data to temperature variation using the following equation (1):

$dT(x,t)/dt = \mu D(x,t) + \beta(t)$ wherein D(x,t) is the low-frequency DAS, μ is the constant that convert optical phase rate to temperature variation, β(t) is the drift noise existing in the DAS data;

estimating borehole temperature by minimizing the error function ε using the following equation (2):

$$\varepsilon = \|T - T\_0\| + \lambda \|dT/dt - \mu D - \beta\| \quad (2)$$

wherein T_0 is the DTS data, D is the inverted DAS data, and A is a parameter that determines the relative importance of minimizing the DAS data misfit, as compared to DTS misfit, and λ may be frequency dependent.

A system for measuring temperature in a wellbore, comprising:

a distributed acoustic sensing (DAS) monitoring device including an optical fiber that runs along a length of a wellbore, wherein the DAS optical fiber is coupled to an interrogating unit for emitting interrogating signals, the DAS monitoring device detects DAS signals when temperature variations cause deformation of said optical fiber;

wherein said optic fiber or a second optic fiber is connected to a distributed temperature sensing (DTS) monitoring device having a DTS interrogating unit for emitting interrogating signals;

a computer coupled to the DAS monitoring device for recording DAS signals detected by the DAS monitoring device, the computer also coupled to the DTS monitoring device for recording DTS signals detected by the DTS monitoring device;

wherein the computer performs the following steps to obtain temperature estimation along said wellbore from said recorded DAS and DTS data:

processing DAS data to obtain low-frequency DAS data;

converting low-frequency DAS data to temperature variation using the following equation (1)

$$dT(x,t)/dt = \mu D(x,t) + \beta(t) \quad (1)$$

wherein D(x,t) is the low-frequency DAS, μ is the constant that convert optical phase rate to temperature variation, β(t) is the drift noise existing in the DAS data.

estimating temperature measurement by minimizing an error function ε using the following equation (2)

$$\varepsilon = \|T - T\_0\| + \lambda \|dT/dt - \mu D - \beta\| \quad (2)$$

wherein T_0 is the DTS data, D is the low-frequency DAS data, and λ is a parameter that determines the relative importance of minimizing the DAS data misfit, as compared to DTS misfit, which may be frequency dependent.

Any method or system herein described, wherein the wellbore is undergoing fracturing, shut-in, production, steam/water injection, or a combination thereof.

Any method or system herein described, wherein said fiber optic cable is embedded in a cement of the wellbore. It could also be housed in a coiled tubing string, or be a part of a wireline, or a carbon rod in the wellbore.

Any method or system herein described, wherein recorded DAS signals are low-pass filtered at 0.001-1 Hz and sub-sampled to a 1-second sample rate.

Any method or system herein described, wherein DAS and DTS signals are sampled at more than 1 kHz, preferably more than 5 kHz, more preferably more than 10 kHz to avoid aliasing from a high-frequency band.

The fiber optics used in this disclosure can be single-mode fiber optics or multi-mode fiber optic cable. For one single cable used for both DAS and DTS detection, a multi-mode fiber optic cable is preferred. Alternatively, two or more single-mode fibers may be bundled together to improve signal quality and range of use. Additionally, two separate fibers may be run independently one for DAS and the other for DTS.

In fiber-optic communication, a single-mode optical fiber ("SW") is an optical fiber designed to carry light only directly down the fiber—the transverse mode. Modes are the possible solutions of the Helmholtz equation for waves, which is obtained by combining Maxwell's equations and the boundary conditions. These modes define the way the wave travels through space, i.e. how the wave is distributed in space. Waves can have the same mode, but have different frequencies. This is the case in single-mode fibers, where waves with different frequencies, can be the same mode, which means that they are distributed in space in the same way, and that provides a single ray of light. Although the ray travels parallel to the length of the fiber, it is often called a "transverse" mode since its electromagnetic vibrations occur perpendicular (transverse) to the length of the fiber.

The main difference between "multi-mode" and single-mode optical fiber is that the former has much larger core diameter, typically 50-100 micrometers; much larger than the wavelength of the light carried in it. Because of the large core and also the possibility of large numerical aperture, multi-mode fiber has higher "light-gathering" capacity than single-mode fiber. However, compared to single-mode fibers, the multi-mode fiber bandwidth-distance product limit is lower. Because multi-mode fiber has a larger core-size than single-mode fiber, it supports more than one propagation mode; hence it is limited by modal dispersion, while single mode is not.

A "multi-mode fiber" is a type of optical fiber that has a large diametral core that allows multiple modes of light to propagate, and as such, the number of light reflections created as the light passes through the core increases, creating the ability for more data to pass through at a given time. This also means allowing two or more interrogating signals to be emitted along the same cable. Because of the high dispersion and attenuation rate with this type of fiber, the quality of the signal is reduced over long distance, thus it is typically used for short distance.

As used here, a "low frequency" signal refers to a frequency component of the DAS signal that has a period of about 1 second or greater for an interferometer length of a few meters. By using the phase of the low frequency components of the DAS signal, the temperature changes of the well can be estimated and monitored in real time and with much higher precision than is possible with a conventional short DTS measurement. The processor is configured to process DAS signal data to separate out the low frequency oscillations present in DAS signals.

As described herein, the temperature difference required to shift the signal by one interferometer fringe is about 0.15° C./L or up to a factor of two. For reasonable laser pulse widths this allows for the real time monitoring of well temperature changes.

A "conversion" refers to mathematical transformation of data into a physical measurement. As used herein, we convert DAS raw phase data into the temperature variation.

An "inversion" refers to the estimation of the result by minimizing a particular error function. As used herein, we invert the accurate temperature measurement from DAS and DTS data.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | Term |
|---|---|
| CC | Code Correlation |
| DAS | Distributed Acoustic Sensing |
| DTS | Distributed Thermal Sensing |
| FBG | Fiber Bragg Gratings |
| FE | Formation Evaluation |
| FFT | Fast Fourier Transform |
| IU | Interrogating Unit |
| LGD | Logging-While-Drilling |
| OFDR | Optical Frequency Domain Reflectometry |
| OTDR | Optical Time Domain Reflectometry |

DESCRIPTION OF EMBODIMENTS OF THE INVENTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The DAS technology is briefly explained herein. Through Rayleigh scattering, light transmitted down the cable will continuously backscatter light so that it can be sensed, preferably at the interrogating unit (IU). As light in an optical fiber travels at a speed of approximately 0.2 m/ns, a 10-ns pulse of light occupies about 2 m in the fiber as it propagates. In theory, each 10 nanoseconds of time in the optical echo response can be associated with reflections coming from a 1-m portion of the fiber (two-way time of 10 ns). By generating a repeated pulse every 100 μs and continuously processing the returned optical signal, it is possible to interrogate the entire length of up to 10 km of fiber at a 10-kHz sample rate.

Local changes in the optical signal, such as temperature changes that expand or contract the fiber will cause deformation in the glass fiber, thus changing the backscatter of the interrogating light signal, making it possible to use the fiber as a continuous array of sensors with nearly continuous sampling in time and space. Particularly, DAS is very sensitive to deformations caused by temperature variation, up to 1E-5° F./s.

DTS, on the other hand, measures and records temperatures also by optical fibers as linear sensors, and along the sensor cable to read out a continuous profile. DTS relies on scattering of light along a fiber-optic cable to determine temperature. Laser light is sent down the length of the fiber-optic cable where variations in temperature cause differences in backscatter, changing the wavelength and intensity of light. The scattered light travels back up the fiber-optic cable as a higher (Stokes) and a lower (anti-Stokes) wavelengths. Variation in the intensity of the Stokes wavelength is not affected by temperature, but the variation in intensity of the anti-Stokes wavelength is affected by temperature. On the basis of the ratio of the two intensities, temperature at a given section of the cable can be calculated. Measurements are recorded over 1-m sections along the length of the cable approximately every 15-20 s, depending on the system used. Measurements along each meter of the cable are then averaged over a specific time period to reduce instrument noise.

To combine DAS with DTS, preferably the same fiber optic cable is used, which is preferably embedded in the wellbore cement, or included inside a coiled tubing string, a wireline, or a carbon rod. Separate fibers can also be used, and is more common at this time.

Embedding the fiber(s) in the wellbore cement has the advantages of known precise location information and less chance to be damaged by production fluids, whereas including the fiber optic cable in the coiled tubing has the advantages of lower construction cost and even more sensitive temperature measurement as the temperature variation will be more readily detectable without passing through the cement. However, this configuration is not essential and multiple fibers and other deployment methods could be used.

In this example, the DAS and DTS data acquisition has to happen simultaneously at the same well. By combining DTS with DAS, it is possible to achieve an absolute temperature measurement as accurate as 1E-4° F., which is up to 10,000 times more accurate than the current DTS solution.

The DTS data provides the absolute borehole temperature measurement, presented as T_0(x,t), x being distance from the interrogating unit, and t being sampling time. The low-frequency DAS data, which is usually optical phase rate in rad/s, does not contain the absolute temperature information. However, DAS is extremely sensitive to temperature variations with time. The DAS optical phase rate is proportional to temperature variation, which can be presented as $$\frac{dT(x, t)}{dt} = \mu D(x, t) + \beta(t) \quad (1)$$

where D(x,t) is the low frequency DAS data, μ is the ratio between DAS optical phase rate and temperature variation, $\beta(t)$ is the non-zero drift in the DAS data which is channel independent and caused by instrument noise.

To convert the DAS raw optical phase data into the temperature variation, parameters $\mu$ and $d(t)$ need to be inverted by comparing the DAS data with temperature gauge or DTS data. One way to perform this inversion is to use the Least-Square method in a matrix form.

$$g_k = \frac{dT(x_i, t_j)}{dt},$$

We first vectorize the measured data by assuming which can be either temperature gauge measurements or DTS measurements, and $d_k=D(x_i,t_j)$, which are the low-frequency DAS measurement. The drift noise $\beta(t)$ usually varies slowly with time, thus can be subsampled as:

$$\beta(t) = A \begin{bmatrix} \beta_1 \\ \beta_2 \\ \beta_3 \\ \vdots \\ \beta_m \end{bmatrix}$$

Where A is an interpolation matrix. The Eq. (1) can be rewritten in a matrix form as:

$$\begin{bmatrix} g_1 \\ g_2 \\ \vdots \\ \vdots \\ g_n \end{bmatrix} = \begin{bmatrix} [A]_{n \times m} & \begin{bmatrix} d_1 \\ d_2 \\ \vdots \\ d_n \end{bmatrix} \end{bmatrix} \begin{bmatrix} \beta_1 \\ \beta_2 \\ \vdots \\ \beta_m \\ \mu \end{bmatrix}$$

The parameters can then be estimated by least-square inversion as:

$$\begin{bmatrix} \beta_1 \\ \beta_2 \\ \vdots \\ \beta_m \\ \mu \end{bmatrix} = (M^T M)^{-1} M^T \begin{bmatrix} g_1 \\ g_2 \\ \vdots \\ \vdots \\ g_n \end{bmatrix}$$

Where $$M = \begin{bmatrix} [A]_{n \times m} & \begin{bmatrix} d_1 \\ d_2 \\ \vdots \\ \vdots \\ d_n \end{bmatrix} \end{bmatrix}$$

Parameters $\mu$ and $\beta(t)$ can also be estimated by other inversion methods like gradient descent, Levenberg-Marquardt algorithm, etc.

The final targeted temperature field $T(x,t)$ should satisfy both DAS and DTS datasets at the same time. For that to happen, $T(x,t)$ can be obtained by minimizing the misfit of both datasets. The error function to be optimized can be presented as:

$$\varepsilon = \|T - T_0\| + \lambda \left\| \frac{dT}{dt} - \mu D - \beta \right\| \quad (2)$$

where $T_0$ and $D$ are DTS and DAS data, and $\lambda$ is a parameter that determines the relative importance of minimizing the DAS data misfit, as compared to the DTS misfit. $\lambda$ may also be frequency dependent since the signal-to-noise ratio of DAS and DTS data is frequency dependent. In this case, the inversion may be performed in frequency domain instead of in time domain. The optimized temperature $T(x,t)$ contains absolute temperature information from DTS, while also incorporating the accuracy of the DAS measurement of up to 1E-4° F.

The results of this data processing methodology can be used to calibrate fracture and reservoir stimulation models to facilitate optimization of completion and well spacing. The results can also refine fracture geometry for new fracking configurations, which is beneficial for predicting well economy for future development.

Scattered light pulses from nearby segments of the fiber are combined in an interferometer. The phase differences between the pulses is then a measure of their relative separations of their origins. A change in separation as small as one one-hundredth percentage of a wavelength can easily and accurately be measured. This typically amounts to a 1E-5 percentage change in fiber length (strain). Although DAS was originally designed to record fiber strains due to acoustic waves of frequencies up to 10 kHz, its response also extends to very low frequencies (<0.01 Hz). Preferably, this disclosure utilizes low frequency DAS for higher accuracy of detecting temperature variation.

DAS Data Acquisition

DAS signal is recorded in the stimulated or production well (in-well), and if necessary in the offset wells (cross-well) as well, during the completion and production stages. In this test, only DAS signals recorded in the production well were processed. However, the processing flow is same for other cases.

The distances between the stimulated well and offset monitor wells ranged from 50 ft to 1200 ft. The fiber-optic cables were installed out of the casing and cemented in place to avoid unwanted DAS noise caused by fiber deformation during fluid injection or production. Numerous interrogators are available to record optical signals, and any suitable instrument can be used. In one embodiment, Pinnacle Gen-1 Phase-1 interrogators are used for the recording.

The low frequency band we are interested in is 0-1 Hz. However, the data should be sampled at >1 kHz to avoid aliasing from the high-frequency band. In one embodiment, the raw data was thus sampled at 10 kHz continuously at more than 6000 locations (referred as "channels" in this study) with 1 m spatial separation along the fiber. The gauge length was set to 5 m. When recording, the measured optical phase is differentiated in time, so the raw DAS data is linearly associated with strain rate along the fiber. The recorded DAS data are then low-pass filtered at 0.001-1 Hz and sub-sampled to a 1-second sample rate.

DTS Data Acquisition

As discussed above, Raman backscatter sensing is typically used for DTS monitoring, but Brillouin backscatter sensing can also be used, if desired. Brillouin or Rayleigh backscatter sensing may be used for DAS or DTS monitoring, with preferably Brillouin backscatter gain or coherent Rayleigh backscatter being sensed. The interrogation signal length and frequency can be varied depending on the specific borehole conditions as is well known in the art.

Data Processing

Figure 1:
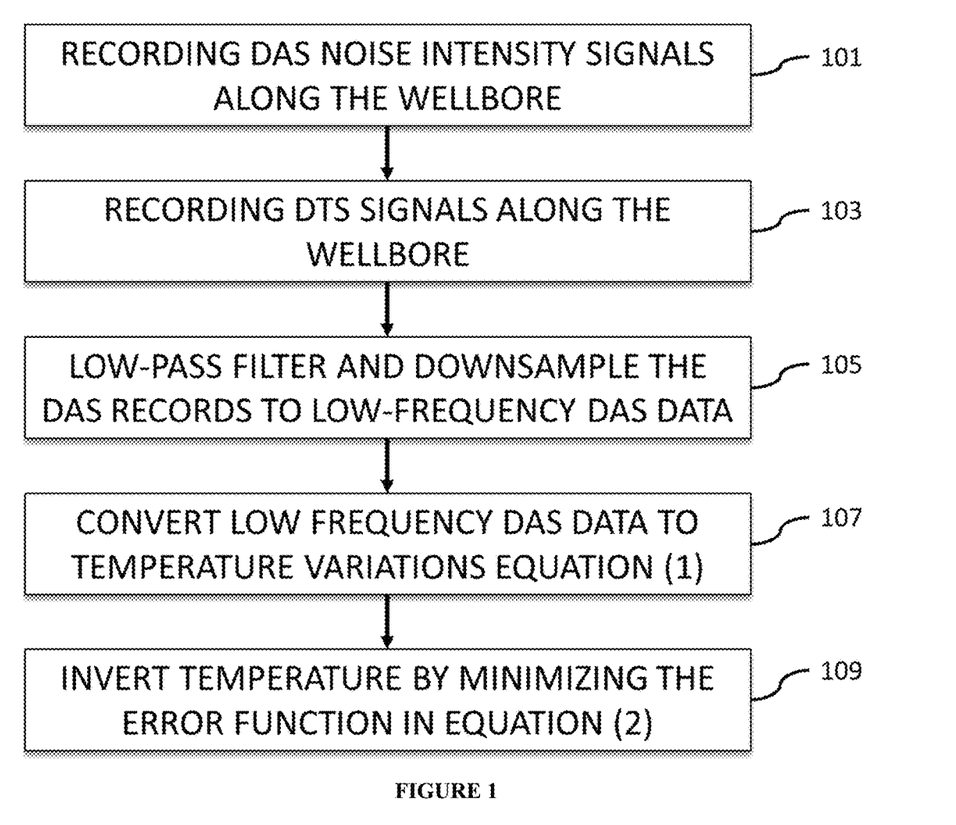
FIG. 1 is the flow diagram of the method of this disclosure.

FIG. 1 describes the data processing steps employed in our tests. In step 101, the DAS data was measured and recorded as described above. In the case where multi-mode fiber optic sensors are used, additional data collection can also be implemented to corroborate the DAS data.

Figure 2A:
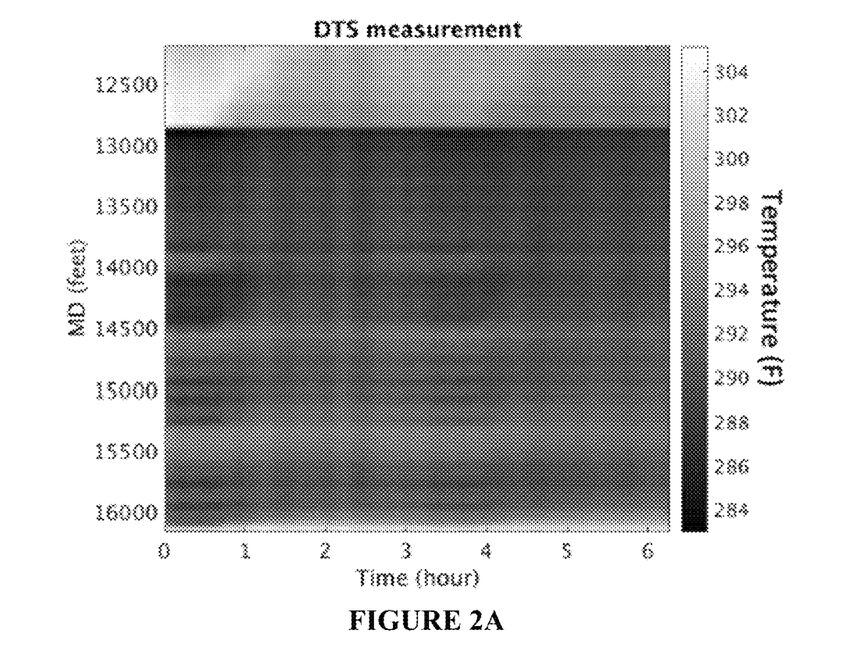
FIG. 2A is exemplary DTS data.
Figure 2B:
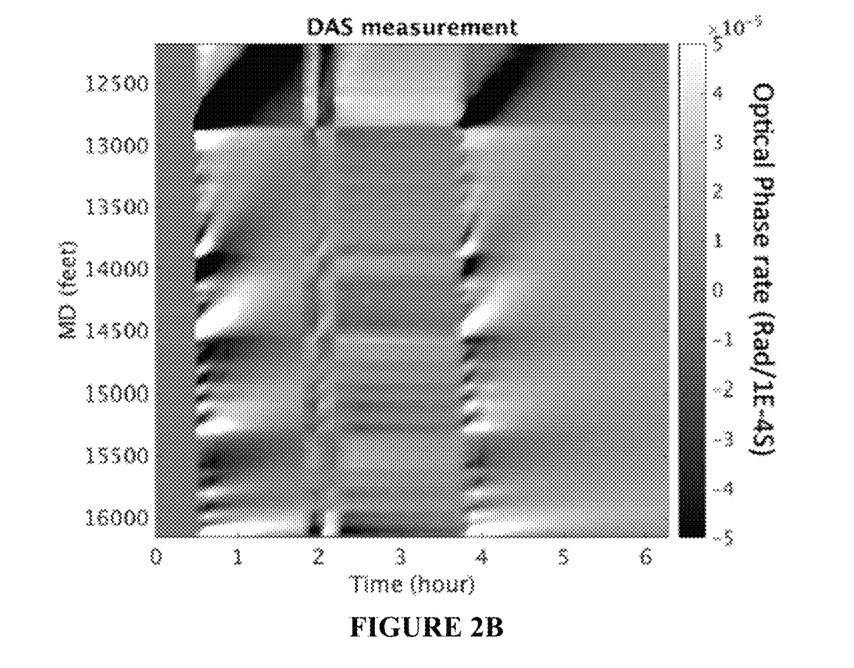
FIG. 2B is exemplary of low-frequency DAS data.

In step 103, the DTS data was measured and recorded as described above. The recording of DAS and DTS should be simultaneous and covering the same section of the monitored well. In the case where multi-mode fiber optic sensors are used, additional data collection can also be implemented to corroborate the DTS data. In these two steps 101, 103, the optic fiber cable is either situated in an injection/production well for real-time monitoring of injection/production progress, or in an offset well to determine for example the payzone condition, fracking effectiveness, or production interference. In our test, the cable was cemented outside the tubing string of a production well. Exemplary DTS and DAS data are shown in FIGS. 2A and 2B, respectively.

In step 105, the DAS recordings were low-pass filtered and down sampled to generate low-frequency DAS data.

Figure 2C:
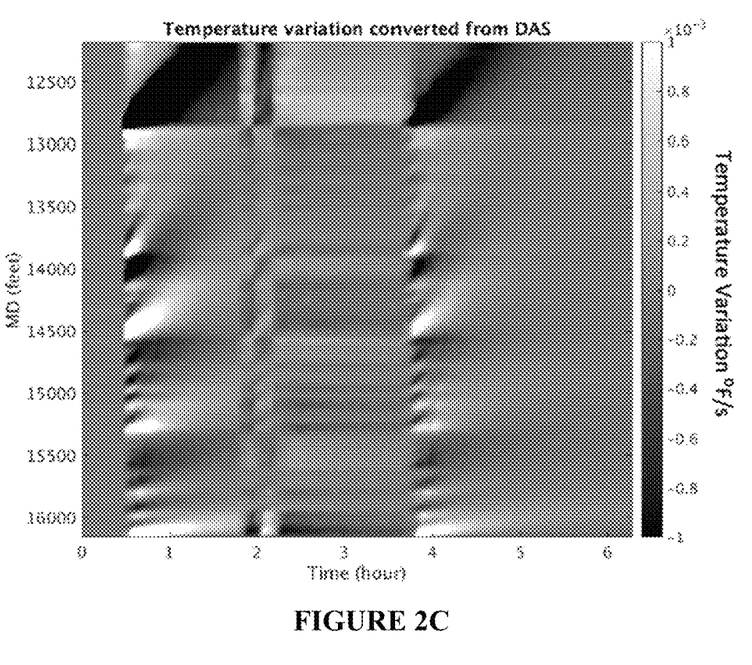
FIG. 2C is exemplary of temperature variation converted from the DAS data.

In step 107, the low-frequency DAS data were converted to temperature variation. Exemplary converted temperature variation is shown in FIG. 2C.

In step 109, the DTS and converted DAS data were combined. The combining was performed by a computer processor, which in step 109 fit both sets data to the temperature function T(x,t) by minimizing the error function ε in Equation (2).

Figure 3:
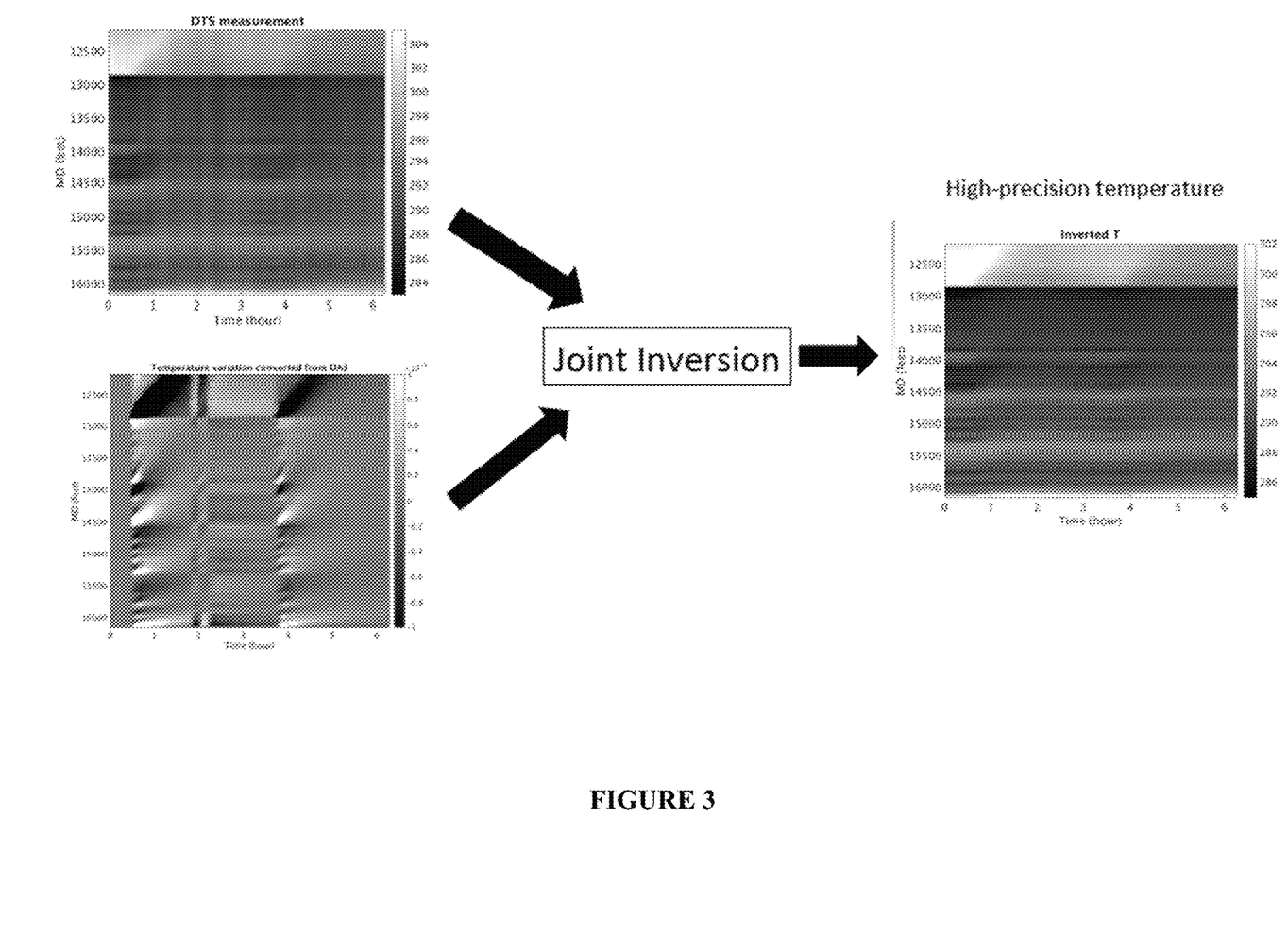
FIG. 3 is an illustration of combining DTS data with DAS data to visualize the combined inversion that shows the temperature estimation.

The thus-combined inverted data is shown in FIG. 3.

Figure 4A:
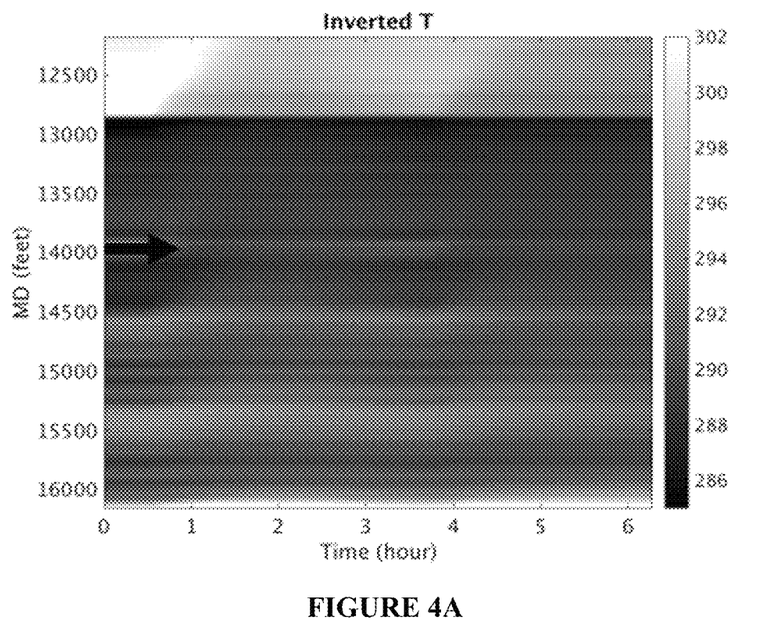
FIG. 4A is the resulting temperature estimation.
Figure 4B:
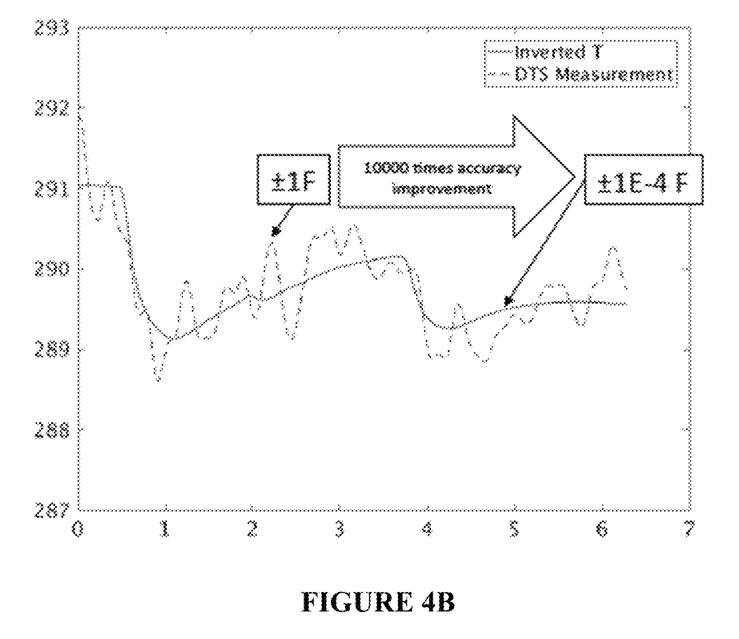
FIG. 4B is a comparison of temperature variation from a conventional DTS data and the combined DTS/DAS inverted result as described herein.

Further shown in FIG. 4 is a comparison that shows the temperature estimation obtained by the disclosed method and by DTS measurement alone at the measure depth 14000 ft. As shown, the estimation obtained according to this disclosure has a much more accurate (about four orders of magnitude) temperature measurement than the DTS measurement alone. Further, the sampling and response time was also instantaneous thanks to the interrogating frequency.

The data processing method can also be used to monitor well performance over a long period of time, such that any significant change in production profile can be addressed with adjusted completion designs.

Figure 5:
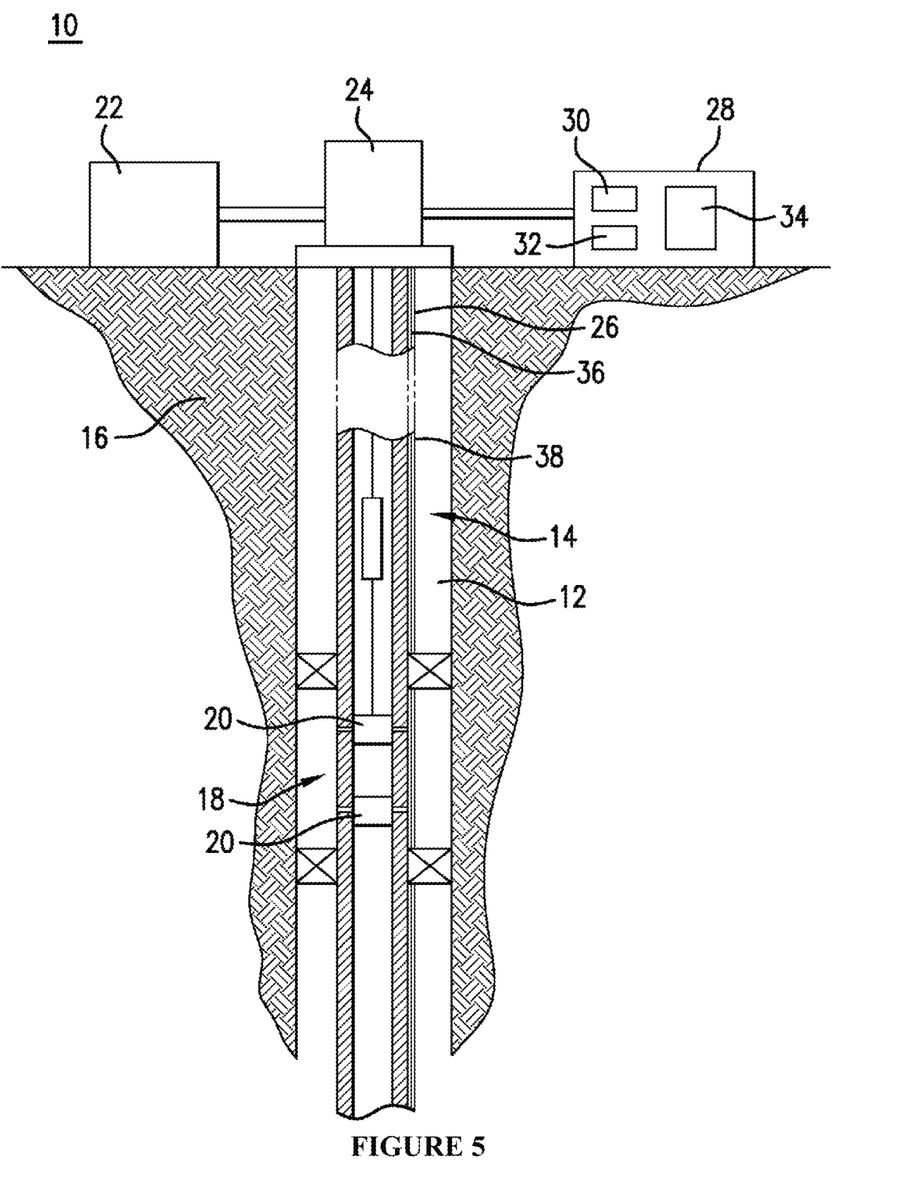
FIG. 5 is an illustration of a DTS/DAS combination system.

An exemplary well system is shown in FIG. 5. The evaluation and production system 10 associated with a borehole 12 is shown. A borehole string 14 is disposed in the borehole 12, which penetrates at least one earth formation 16 for facilitating operations such as drilling, production and making measurements of properties of the borehole 12 and/or the formation 16. The borehole string 14 includes any of various components to facilitate subterranean operations. The borehole string 14 is made from, for example, a pipe, multiple pipe sections or flexible tubing. The borehole string 14 includes for example, a drilling system and/or a bottomhole assembly (BHA).

The system 10 and/or the borehole string 14 include any number of downhole tools 18 for various processes including drilling, hydrocarbon production, and formation evaluation (FE) for measuring one or more physical quantities in or around a borehole. Various measurement tools may be incorporated into the system 10 to affect measurement regimes such as wireline measurement applications or logging-while-drilling (LWD) applications.

The borehole string 14 is configured e.g., as a production string and includes a tool 18 configured as a stimulation assembly as part of, for example, a BHA. The stimulation assembly is configured to inject stimulation fluids such as hydraulic fracturing fluids and/or acid stimulation fluids into the formation. Stimulation fluids may include any suitable fluid used to reduce or eliminate an impediment to fluid production. But stimulation is not a necessary part of this disclosure.

For example, the system 10 includes one or more injection assemblies 20 configured to control injection of stimulation fluid and direct stimulation fluid into one or more production zones in the formation. Each injection assembly 20 includes, e.g., one or more injection or flow control devices configured to direct stimulation fluid from a conduit in the string 14 to the borehole 12. A fluid source 22 may be coupled to a wellhead 24 and injected into the borehole string 14.

The system 10 also includes one or more fiber optic components configured to perform various functions in the system 10, such as communication and sensing various parameters, especially temperature. The fiber optic component includes a fiber optic sensor 26 configured to measure downhole properties such as temperature, pressure, stress, strain, vibration and deformation of downhole components such as the borehole string 14 and the tools 18. The optical fiber sensor 26 includes at least one optical fiber having one or more sensing locations disposed along the length of the optical fiber sensor 26. Examples of sensing locations include fiber Bragg gratings (FBG), mirrors, Fabry-Perot cavities and locations of intrinsic scattering. Locations of intrinsic scattering include points in or lengths of the fiber that reflect interrogation signals, such as Rayleigh scattering locations.

The monitoring system includes an interrogation unit 28 configured to transmit an electromagnetic interrogation signal into the optical fiber sensor 26 and receive a reflected signal from one or more locations in the optical fiber sensor 26. The interrogation unit 28 includes components such as a signal source 30 (e.g., a pulsed light source, LED, laser, etc.) and a signal detector 32. In one embodiment, a processor 34 is in operable communication with the signal source 30 and the detector 32 and is configured to control the source 30 and receive reflected signal data from the detector 32. An example of an interrogation unit is a reflectometer unit that includes an OFDR and/or OTDR type interrogator unit.

The optical fiber sensor 26 can be configured as a distributed acoustic sensor (DAS), which includes at least one DAS optical fiber 36, such as a single mode fiber, coupled to the interrogation unit 28. The interrogation unit 28 (or other processing device configured to receive interferometer data) is configured to estimate temperature variation based on the DAS signals.

The system 10 may also include a DTS assembly that includes at least one DTS optical fiber 38, which can be the same or different from 26. The DTS fiber can be coupled to a separate interrogation unit or other device for transmitting and receiving signals, or can be coupled to the DAS interrogation unit 28.

It is to be noted that the fiber optics used in this disclosure were embedded in the external casing to avoid any undesirable deformation, but that would limit the applicability to wells already having fiber optics. We envision that with additional testing and calibration, the same methodology would be applicable to fiber optics deployed inside coiled tubing, wireline, or carbon rod, thus broadening its use to non-fiber-equipped wells.

The disclosed method provides a mechanism of temperature estimation using DAS/DTS that is up to 10,000 times more accurate than currently available technique that monitors temperature continuously along the borehole. The ability to do this accurately has several potential applications as outlined below.

In one embodiment, the inventive method is used during hydraulic fracturing. An optical fiber is deployed in an offset monitor well, and the fractures can be detected by monitoring the small temperature variations induced by fracture propagation and injection fluid movement from the stimulation well. Because the disclosed method can now measure up to $\pm 1E-4°$ F., fracture propagation can be readily detected because the fracturing fluid has different thermal energy from the non-fractured formation, and the small changes within detecting limits represent the intersection of fractures at the monitor well.

In another embodiment, the inventive method is used during production. By periodically changing the total production rate, the borehole fluid temperature distribution slightly varies due to the change of borehole flow rate. By modeling the induced temperature variation, it is possible to estimate the borehole fluid flow rate, which provides production allocation information. As is known, this type of information can be used to optimize efficiencies of production.

In another embodiment used during production, by placing optical fiber in a non-producing offset monitor well and changing the production rate of the producing well, it is possible to estimate the production interference between these two wells by measuring the small temperature variations induced by the cross flow in the monitor well borehole. As such, the production interference in the field may be minimized adjusting well spacing and completion designs.

The high-precision temperature estimation obtained from jointly inverting the DAS and DTS data is up to 10,000 times more accurate than the current commercial solution. It is a critical step towards the fiber-optical based production logging. The current fiber-based production logging solution that relies solely on DTS measurements fails to yield unique production profiles. The new production logging method that combines DTS and DAS is potentially more accurate, unique and reliable. The jointly inverted temperature measurements also have many other potential applications, including completion monitoring, cross-well interference testing, and borehole pump integrity checking.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

The following references are incorporated by reference in their entirety for all purposes:

U.S. Provisional Application Ser. No. 62/305,758 filed Mar. 9, 2016, entitled "LOW FREQUENCY DISTRIBUTED ACOUSTIC SENSING,"
U.S. Provisional Application Ser. No. 62/305,777 filed Mar. 9, 2016, entitled "PRODUCTION LOGS FROM DISTRIBUTED ACOUSTIC SENSORS,"
Co-pending application filed Mar. 8, 2017, entitled "Drilling Well Location and Ranging using DAS."
Co-pending application filed Mar. 8, 2017, entitled "The DAS Perf-PumpWork method of fluid distribution."
Co-pending application filed Mar. 8, 2017, entitled "Hydraulic fracture monitoring by low-frequency DAS."
Co-pending application filed Mar. 8, 2017, entitled "Low-Frequency DAS SNR Improvement."
U.S. Pat. No. 6,778,720, "Dual slope fiber optic array interrogator," (2004).
U.S. Pat. No. 7,668,411, "Distributed vibration sensing system using multimode fiber," (2010).
US20060272809, "Wellbores utilizing fiber optic-based sensors and operating devices," (2006).
US20090114386, "Systems and methods for distributed interferometric acoustic monitoring," (2009).
US20130298635, "Techniques for Distributed Acoustic Sensing," (2013).
US20140358444, "Method of Hydraulic Fracture Identification Using Temperature," (2014).
US20150146759, "Temperature sensing using distributed acoustic sensing," (2015).
US20160003032, "Matrix Temperature Production Logging Tool," (2016).
WO2015076976, "Temperature sensing using distributed acoustic sensing" (2015).
Boman, K., (2015), DAS technology expands fiber optic applications for oil, gas industry: Rigzone, May 4 issue.
Webster, P., et al., "Developments in Diagnostic Tools for Hydraulic Fracture Geometry Analysis," Unconventional Resources Technology Conference (URTeC), Denver, Colo., 12-14 Aug. 2013.
Optasense, "Pipeline Integrity Management: Leak Detection," www.optasense.com (2013).

The invention claimed is:

1. A method of measuring temperature variations along a wellbore, the method comprising:
   a) providing one or more fiber optic cables along a length of a wellbore;
   b) recording distributed acoustic sensing (DAS) signals along the wellbore well using at least one fiber optic cable;
   c) simultaneously recording distributed temperature sensing (DTS) signals from the well using at least one fiber optic cable;
   d) low-pass filter and down-sample the DAS signals to obtain low-frequency DAS data;
   e) converting the low-frequency DAS data to temperature variation using the following equation (1):
   wherein D(x,t) is the low-frequency DAS, $\mu$ is the constant that converts optical phase rate to temperature variation, $\beta(t)$ is the drift noise existing in the DAS data;
   f) estimating borehole temperature by minimizing the error function c using the following equation (2):

$$\varepsilon = \|T - T_0\| + \lambda \left\| \frac{dT}{dt} - \mu D - \beta \right\| \quad (2)$$

wherein $T_0$ is the DTS data, D is inverted DAS data, and $\lambda$ is a parameter that determines the relative importance of minimizing the DAS data misfit, as compared to DTS misfit, and $\lambda$ may be frequency dependent.

2. The method of claim 1, wherein said one or more fiber optic cables are embedded in a cement of the wellbore.

3. The method of claim 1, wherein said one or more fiber optic cables is included in a coiled tubing string, a wireline, or a carbon rod in the wellbore.

4. The method of claim 1, wherein DAS and DTS signals are obtained at 0-1 Hz.

5. The method of claim 1, wherein DAS and DTS signals are sampled at more than 1 kHz, preferably more than 5 kHz, more preferably more than 10 kHz to avoid aliasing from a high-frequency band.

6. The method of claim 1, wherein recorded DAS signals are low-pass filtered at 0.001-1 Hz and sub-sampled to a 1-second sample rate.

7. The method of claim 1, wherein DAS and DTS signals are obtained at 0-1 Hz and sampled at more than 1 kHz, preferably more than 5 kHz, more preferably more than 10 kHz to avoid aliasing from a high-frequency band.

8. The method of claim 1, wherein the wellbore is undergoing fracturing, shut-in, production, steam/water injection, or a combination thereof.

* * * * *